United States Patent [19]

Pepper, deceased et al.

[11] Patent Number: 4,788,998

[45] Date of Patent: Dec. 6, 1988

[54] ULTRASONICALLY OPERATED WATER FAUCET

[76] Inventors: Robert B. Pepper, deceased, late of Thermal, Calif.; by Jayme P. Ginsburg, executrix, 1539 McAllister St., San Francisco, Calif. 94115

[21] Appl. No.: 146,956

[22] Filed: Jan. 22, 1988

Related U.S. Application Data

[60] Continuation-in-part of Ser. No. 856,699, Apr. 28, 1986, abandoned, which is a division of Ser. No. 658,051, Oct. 3, 1984, Pat. No. 4,598,726, which is a continuation of Ser. No. 486,789, Apr. 20, 1983, abandoned, which is a division of Ser. No. 247,997, Mar. 26, 1981, Pat. No. 4,402,095.

[51] Int. Cl.$^4$ ............................................. E03C 1/00
[52] U.S. Cl. ............................... 137/1; 251/129.04
[58] Field of Search ....................... 137/1; 251/129.04

[56] References Cited

U.S. PATENT DOCUMENTS

| | | | |
|---|---|---|---|
| 3,151,340 | 10/1964 | Tesbina | 251/129.04 |
| 3,333,160 | 7/1967 | Gorski | 251/129.04 X |
| 3,551,919 | 1/1971 | Forbes | 251/129.04 X |
| 3,638,680 | 2/1972 | Kopp | 251/129.04 X |
| 4,437,497 | 3/1984 | Enander | 137/386 |

FOREIGN PATENT DOCUMENTS 1937278  7/1969  Fed. Rep. of Germany ................. 251/129.04

Primary Examiner—Alan Cohan
Attorney, Agent, or Firm—Allston L. Jones

[57] ABSTRACT

A water faucet is disclosed that is automatically turned on and off in response to the proximity of the user's hand or other object to the faucet. An ultrasonic transducer is located in the faucet near the water outlet and transmits bursts of ultrasonic waves. When a wave reflects off a user's hand and creates an echo signal, the echo is detected by the ultrasonic transducer. Circuitry connected to the ultrasonic transducer determines when an object is within a predetermined distance of the faucet by measuring the time elapsed between the transmission of the burst and the reception of the echo. Once an object is within this predetermined distance, the circuitry causes a valve to open and water is supplied by the faucet. Additionally, there is an embodiment wherein the level to which the receptacle is to be filled can be selected by the user and the fill system automatically fills the receptacle to that level. Further, there is a drain control system disclosed that causes fluid to be removed from the receptacle if the user selects an empty level or a fluid level that is lower than the fluid level of the fluid currently within the receptacle. Still further, there is a receptacle having a pilot well in communication with the main portion of the receptacle. The distance measuring sensor can be placed within the pilot well so that the rim of the receptacle exposed to the user is unencumbered.

14 Claims, 15 Drawing Sheets

ULTRASONICALLY OPERATED WATER FAUCET

CROSS REFERENCE

The present application is a continuation-in-part application of co-pending Ser. No. 856,699 filed Apr. 28, 1986, now abandoned which was a divisional application of Ser. No. 658,051 filed Oct. 3, 1984, now U.S. Pat. No. 4,598,726 which was a continuation of Ser. No. 486,789 filed Apr. 20, 1983, now abandoned which was a divisional of Ser. No. 247,997 filed Mar. 26, 1981, now U.S. Pat. No. 4,402,095 all by the same inventor as the present application.

BACKGROUND OF THE INVENTION

This invention relates to the field of water faucets for use in sinks and the like, and more particularly to faucets that turn on or off automatically.

Water faucets that will turn off by themselves have been used for years in public lavatories in order to guard against the waste of water due to faucets being left on accidentally. Where both hot and cold water is available from the faucet, it is doubly important to prevent the waste of hot water since energy must be consumed to heat the water.

The shut-off mechanisms used in the past have usually been spring loaded return devices in the valve mechanism itself. The valve itself may take the form of a spring loaded knob which the user turns approximately on quarter to one half a turn. When the knob is released by the user it returns to its off position. Alternatively the knob may be one which the user pushes to cause water to flow. In either of these types of faucets, a delay mechanism may be built in so that the water will flow for a predetermined amount of time after the knob is released so that the user may wash both hands together. This solution is seldom completely satisfactory because the amount of delay may be too little for some users and for others it may be more than necessary, thus wasting water.

There are many industrial application for water faucets where it is desirable to have a valve mechanism which can be turned on and off without having to use the user's hands. For example, in hospitals, laboratories and industrial work areas of various types one often finds foot or knee operated faucets. These allow the user to wash his hands or objects in his hands without having to operate a faucet control with his hands. This is often necessary for sanitary as well as convenience reasons. However, these types of faucets can be allowed to run longer than is required, thus wasting water.

Home use also accounts for a significant amount of water usage. It is not uncommon for water to be left running while a person does another task and then returns to the sink. Handicapped persons also frequently have difficulty in using standard faucets in an economical manner, and sometimes they require special faucets that can be operated with very little force or with parts of their bodies other than their hands.

None of these prior art devices fully satisfies the need for a faucet which supplies water just for the time it is needed. In addition, some of these mechanical devices only partially satisfy the needs which they were designed to meet, and they are becoming increasingly more expensive to manufacture.

SUMMARY OF THE INVENTION

In accordance with the preferred embodiment of the present invention, a water faucet is provided which has an ultrasonic sensor to sense the presence of a user's hand or an object that is within a desired proximity of a faucet. The ultrasonic sensor is connected to a control circuit that activates an electrically controlled valve. When the user's hand is brought under the faucet, the water is turned on and remains on for as long as the user's hand is under the faucet. When the user's hand is removed, the water is shut off, thus ensuring no more water than is necessary is used.

The ultrasonic sensor comprises an electrostatic, ultrasonic transducer connected to driving and detection circuitry. The transducer is mounted on the faucet near the water outlet and is connected to the circuitry by wires in the faucet housing. The circuitry is contained in a waterproof housing and is, in turn, connected to a solenoid valve in the water line leading to the outlet. Drive circuitry causes the transducer to emit bursts of ultrasonic waves of selected frequencies. An object in the path of these waves will reflect some of them back to the transducer and will be detected by the transducer. Detection circuitry measures the time between the emission of the burst and the detection of the reflected waves. This time is directly proportional to the distance between the object and the transducer. The circuitry can be set to energize the solenoid valve and turn on the water when an object is detected within a predetermined proximity or range of distances from the transducer. In addition, provision can be made so that the object to faucet distance at which the water is turned on or off can be varied as required by the specific application.

A faucet that is operated by a proximity detector has a number of significant advantages over the prior art. Since the faucet is on only during the time the user's hands are under the faucet, there will be less water wasted. Where such a faucet is used for both hot and cold water, conservation of water will also result in the conservation of energy as less hot water is used. In industrial and medical applications such a faucet will be more convenient to use than ones with prior art mechanical linkages, and there will be less likelihood that water will be wasted. The same will be true of home use, especially for the handicapped who may have difficulty using conventional faucets.

In accordance with another embodiment of the present invention, the fluid fill system operates to fill the receptacle in response to a desired fill level selected by the user from a keyboard. In this embodiment the ultrasonic sensor is used only as a distance measuring devices for repeatedly measuring the distance from the fluid outlet to the closest of the bottom of the receptacle or the surface of the fluid in the receptacle. The measured level and the desired level are then repeatedly compared to cause the fluid to flow from the fluid outlet into the receptacle if the measured distance is less than the distance of the desired fluid level, and for terminating fluid flow when the measured distance and the distance to the desired fluid level are substantially the same.

In a third embodiment of the present invention, means for causing fluid to be withdrawn from the receptacle when the distance to the desired fluid level is less than the measured distance, and for terminating the withdrawal of fluid from the receptacle when the measured distance and the distance to the desired fluid level are substantially the same, is provided.

In a fourth embodiment there is a receptacle that defines a pilot well in communication with a main tank with the distance measuring means including a distance sensor that is disposed to be mounted in the pilot well.

DESCRIPTION OF THE PREFERRED EMBODIMENT

Figure 1:
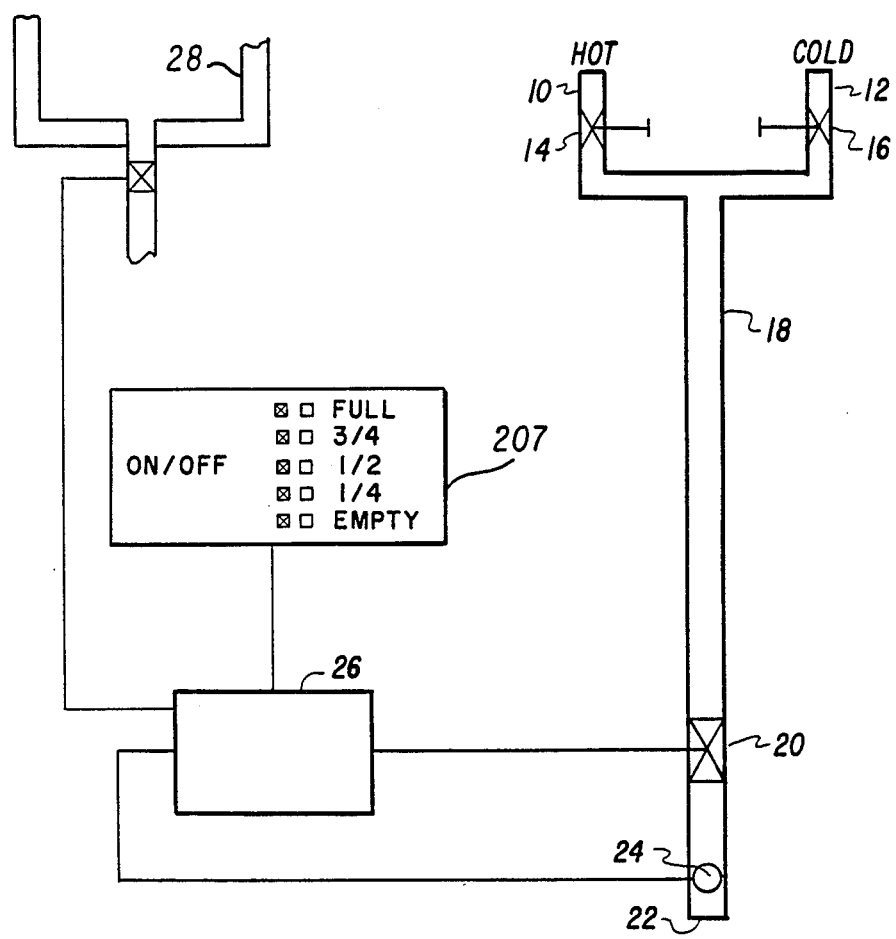
FIG. 1 shows a block diagram of the preferred embodiment of the present invention.

The block diagram of FIG. 1 show a hot water supply line 10 and a cold water supply line 12 coupled to respective manual valves 14 and 16. The water from the two manual valves is mixed together and supplied to a supply line 18, which in turn is connected to a solenoid valve 20. Water from solenoid valve 20 exits from faucet outlet 22 to a sink (not shown). An ultrasonic transducer 24 is mounted near faucet outlet 22 and is electrically connected to control circuitry 26. The control circuitry is electrically connected to the solenoid valve and opens and closes the valve in response to the signals from ultrasonic transducer 24.

Figure 2:
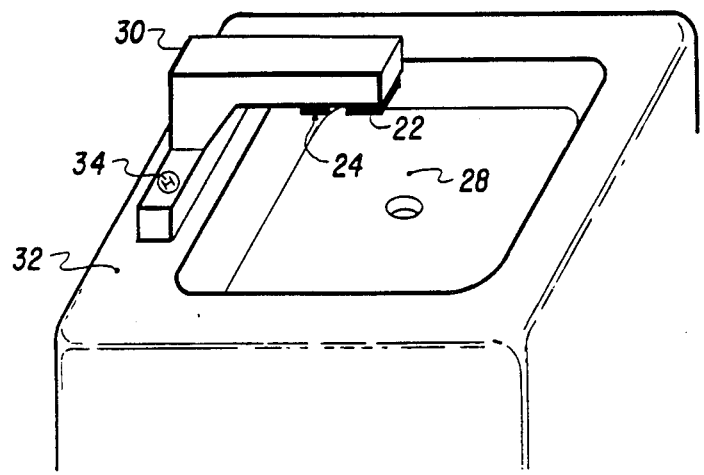
FIG. 2 shows a perspective drawing of a sink with a faucet in accordance with the preferred embodiment of the present invention.

FIG. 2 shows a sink 28 with a faucet 30 mounted over it on a counter 32. Ultrasonic transducer 24 is mounted on the underside of the faucet near outlet 22. There is a control knob 34 for the hot water manual valve to allow for adjustment of the temperature and the flow rate of the water. There is also a control knob the cold water that is not visible in this view.

Figure 3:
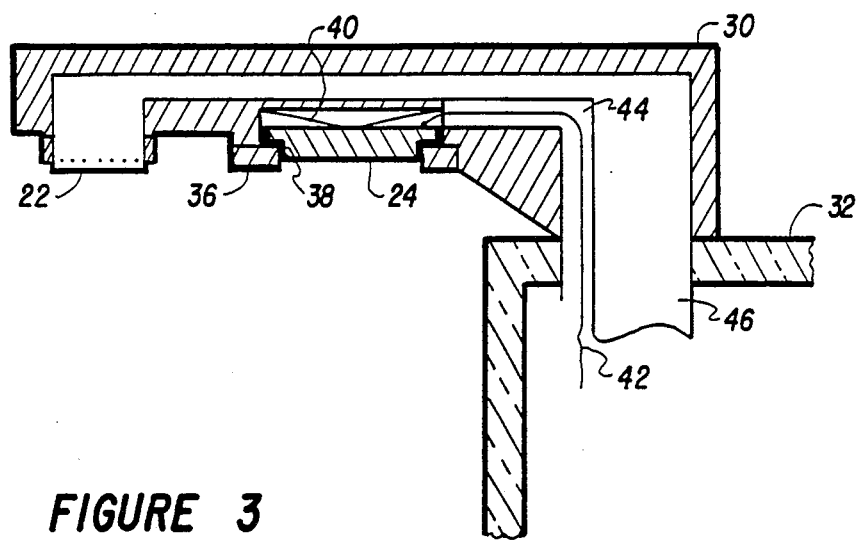
FIG. 3 shows a side cross sectional view of a faucet with an ultrasonic transducer.
Figure 4:
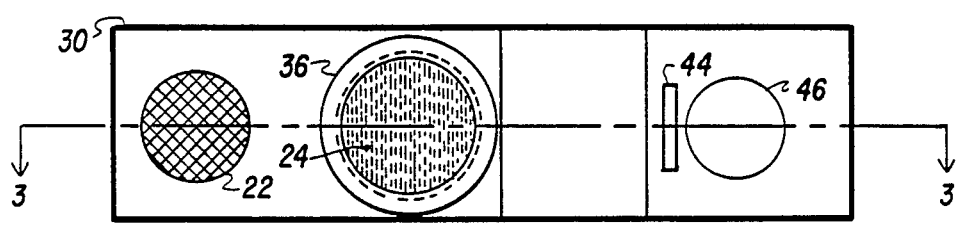
FIG. 4 shows a bottom view of the device of FIG. 3.

In FIG. 3 faucet 30 is shown in cross section, and in FIG. 4 a bottom view of the faucet is shown. Ultrasonic transducer 24 is held in the faucet by a bezel 36 and an electrically insulative seal 38. A retaining spring 40 holds ultrasonic transducer 24 against the seal. An electrical cable 42 is connected to the ultrasonic transducer and is protected by a wireway 44 in the faucet. A waterway 46 carries the water from the solenoid valve (not shown in this figure) to outlet 22. The faucet is fastened to the counter in the conventional manner.

Figure 5:
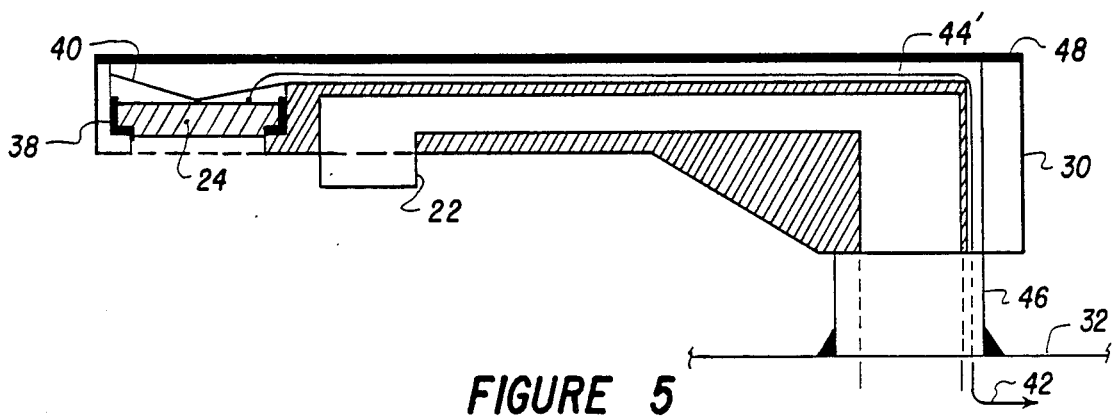
FIG. 5 shows a side cross sectional view of an alternative embodiment of FIG. 3.
Figure 6:
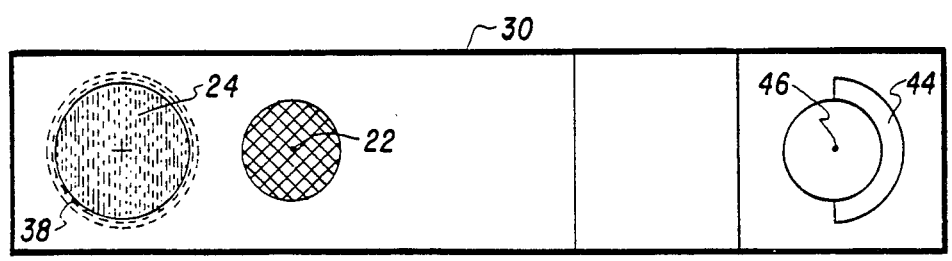
FIG. 6 shows a bottom view of the device of FIG. 5.

FIGS. 5 and 6 show and alternate arrangement of the ultrasonic transducer with respect to outlet 22 to provide for an earlier turn on as the user's hands approach the faucet. Here, with the ultrasonic transducer placed in front of the water outlet, cable 42 is in a wireway 44' formed on top of the waterway and covered by a removable cover 48.

Figure 7:
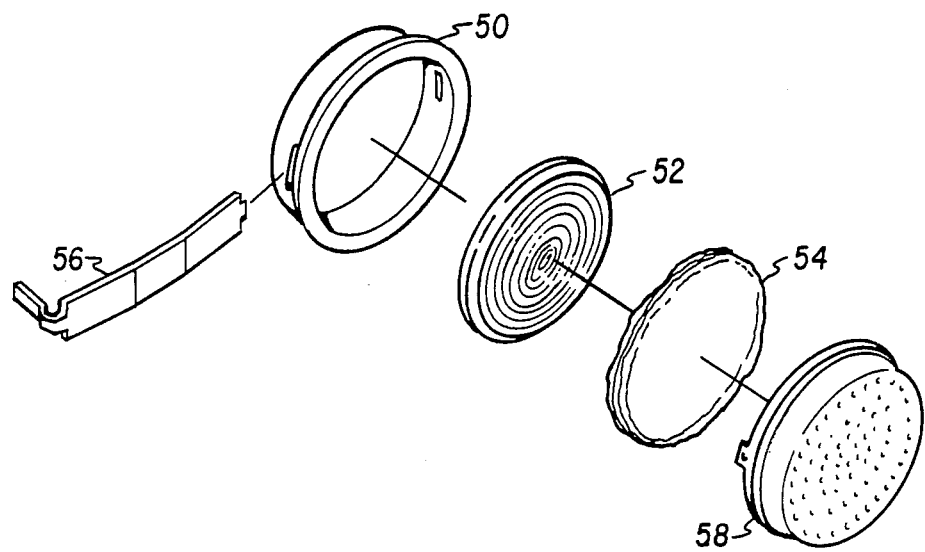
FIG. 7 shows an exploded view of an ultrasonic transducer.

In the exploded view of FIG. 7 it can be seen that ultrasonic transducer 24 comprises an inner ring 50 into which is placed a grooved plate 52 covered by a foil 54. A retainer 56 holds the grooved plate and foil in the inner ring and, the whole assembly is covered by a housing 58. Electrical leads (not shown) are attached to grooved plate 52 and foil 54. The foil comprises a thin insulator covered with a thin conductive layer, and the grooved plate and the foil form a capacitor. This capacitor acts a both an electrostatic loudspeaker and an electrostatic microphone, depending upon the signals applied to it by the circuitry to which it is connected. Ultrasonic waves are generated by placing an alternating current voltage across the plates of the capacitor, and the foil vibrates at the frequency of the voltage, in the same manner as the cone of a loudspeaker. The vibrations of the foil are carried through the air as ultrasonic waves. An ultrasonic transducer of the type just described is disclosed in detail in U.S. Pat. No. 4,085,297 granted Apr. 18, 1978 to Paglia and assigned to the Polaroid Corporation which is hereby incorporated by reference. An alternate embodiment of an ultrasonic transducer is disclosed in U.S. Pat. No. 4,081,626 granted Mar. 28, 1978 to Muggli, et al, and also assigned to the Polaroid Corporation.

Figure 8:
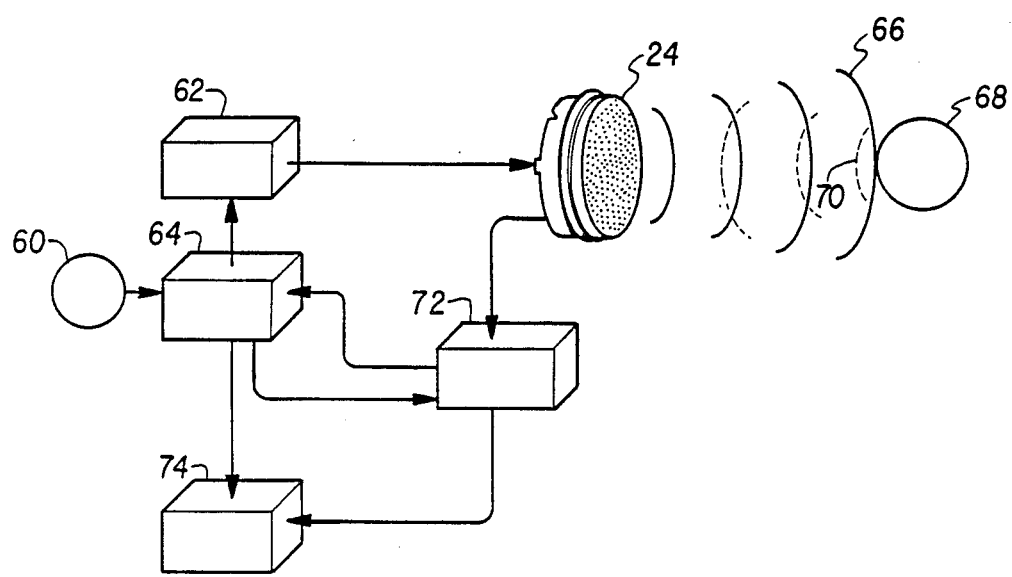
FIG. 8 shows a block diagram of control circuitry with an ultrasonic transducer.

FIG. 8 is a block diagram of control circuitry 26. Ultrasonic transducer 24 is connected to a power interface circuit 62 that is driven by a digital section 64. A precisely controlled alternating current signal is supplied to digital section 64 by a clock circuit 60, and the frequency of the wave emitted by the ultrasonic transducer is determined by clock circuit 60. The power interface circuit supplies the transmit signal to the ultrasonic transducer that produces a transmitted ultrasonic pulse 66. Part of this pulse reflects off of an object 68, such as a hand, in its path and produces an echo 70. The echo returns to the ultrasonic transducer, which now acts like an electrostatic microphone; and the foil vibrates in response to the echo. This vibration is detected by analog circuit 72 connected to ultrasonic transducer 24. The analog circuit is connected to the digital section, and the digital section receives a processed echo signal from the analog circuit. A solenoid control circuit 74 is connected to digital section 64 and analog circuit 72, and the solenoid control circuit energized or de-energized solenoid valve 20 in accordance with the signals received from the analog circuit and the digital section.

Figure 9:
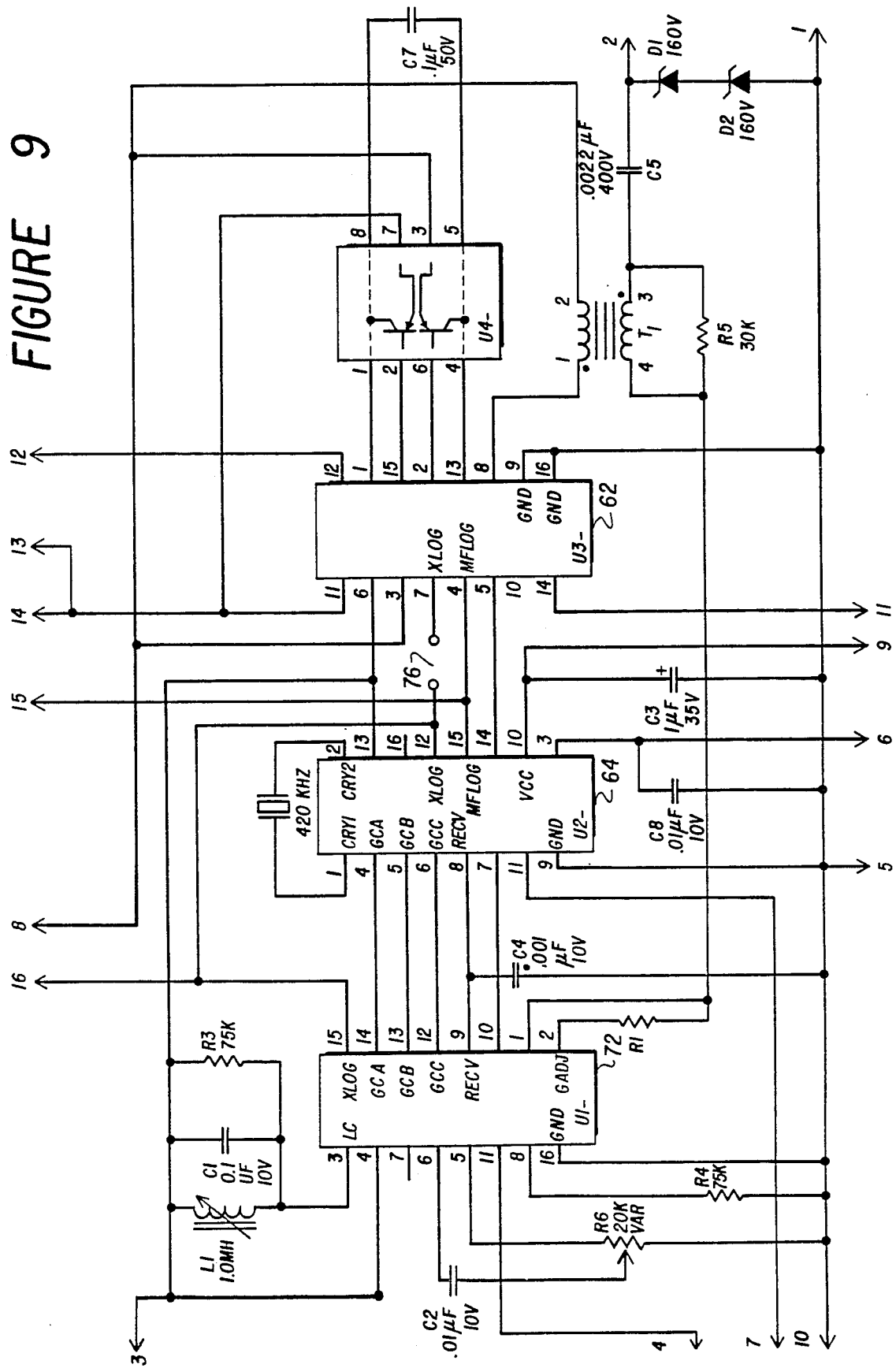
FIG. 9 shows a schematic diagram of a circuit to operate the ultrasonic transducer.

Ultrasonic transducer 24 and the circuitry to operate it, corresponding to clock circuit 60, power interface circuit 62, digital section 64 and analog circuit 72 are available from the Polaroid Corporation in the form of its Ultrasonic Ranging Unit which is used in some of the company's cameras and is also sold separately. FIG. 9 is a schematic diagram of the Polaroid ultrasonic circuit board which operates ultrasonic transducer 24. The transducer is connected to connector pins numbered 1 and 2, and the other relevant connections are shown on subsequent figures showing circuitry that interfaces with the ultrasonic circuit board. The circuits on the ultrasonic circuit board are discussed in greater detail in U.S. Pat. No. 4,199,246 granted Apr. 22, 1980 to Muggli and assigned to the Polaroid Corporation, which patent is hereby incorporated by reference. Alternative ultrasonic ranging circuits are disclosed in the following U.S. Pat. Nos. 3,522,764 granted Aug. 4, 1970 to Biber, 3,523,275 granted Aug. 4, 1970 to Gross and 4,148,574 granted Apr. 10, 1979 to Johnson.

The Ultrasonic Ranging Unit as supplied by Polaroid is set to measure distances between 0.9 and 35 feet. The Polaroid Ranging Unit as described in the patent to Muggli, incorporated by reference above, does not produce an output signal when there is an object that is closer than 0.9 feet to the sensor. This occurs as a result of the predetermined delay time built into the unit between the transmission of an ultrasonic signal and the enablement of the receiving circuit to allow it to respond to an echo from an object. This is referred to as "blanking" by Muggli in U.S. Pat. No. 4,199,246 at column 6, line 59 to column 7, line 9 and is illustrated in FIG. 4(b) of that patent. Muggli's blanking pulse 84 prevents any signals from the ultrasonic transducer from reaching the receiver until after the predetermined delay. The minimum distance that can be measured by Muggli's device due to this blanking is about 25 cm or 10 inches. Since that distance is too great for many uses of applicant's invention, applicant has modified the Muggli device to provide a variety of shorter minimum distances required for his applications.

Figure 10:
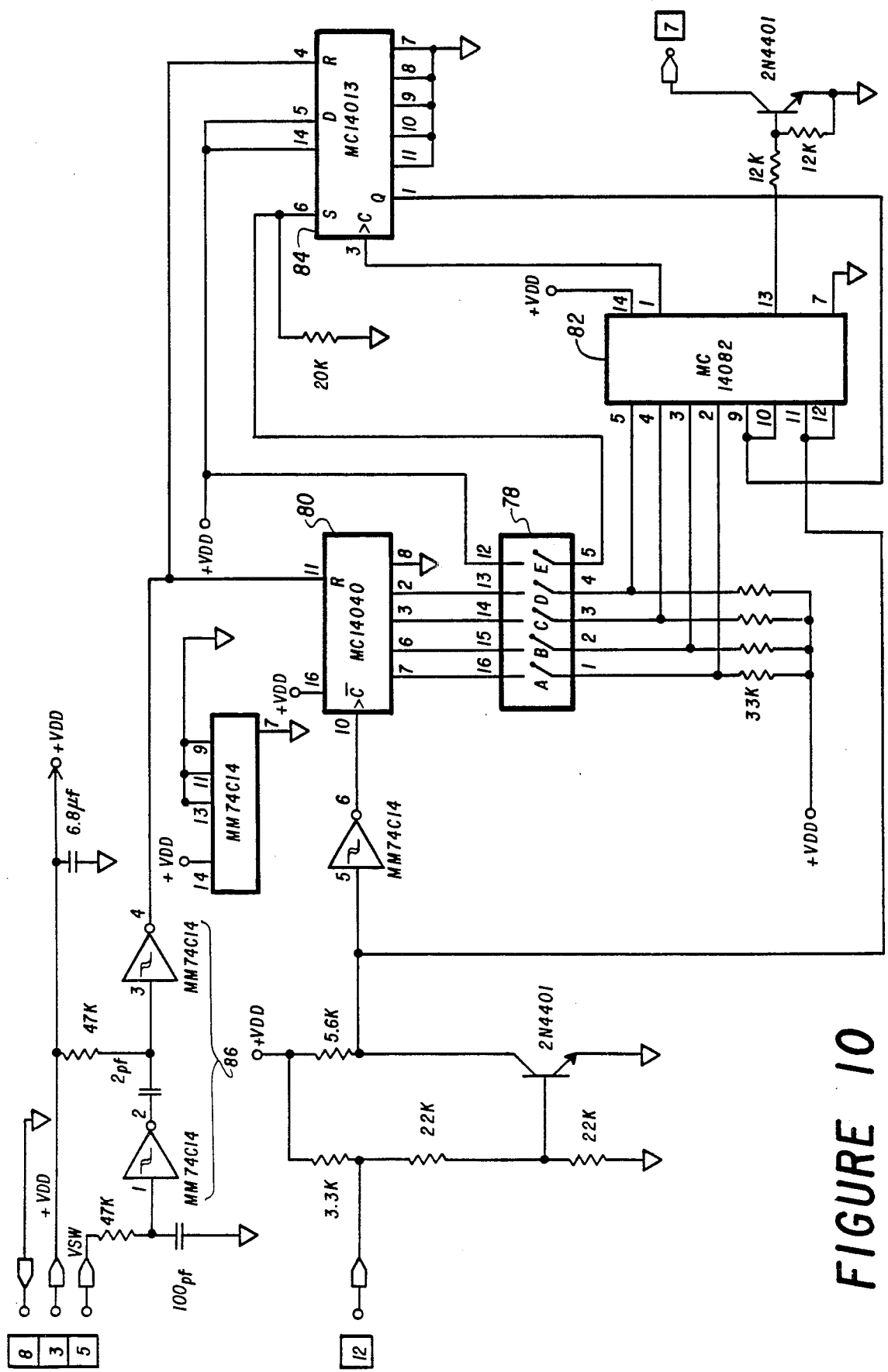
FIG. 10 shows a schematic diagram of a response distance control circuit.

In order to respond to the smaller distances usually encountered between a faucet and a user's hands, some modification must be made to the Polaroid circuit, as shown in FIGS. 9 and 10. FIG. 10 shows a response distance control circuit that is connected between pin 12 on digital section 64 and pin 7 on power interface circuit 62; the connection point is indicated at 76 in FIG. 9.

The ultrasonic burst transmitted by ultrasonic transducer 24, as supplied, contains 56 cycles. If distances shorter than 0.9 feet are to be measured the number of cycles transmitted needs to be reduced. The circuitry in FIG. 10 provides for a selected reduction of the number of cycles transmitted in accordance with the setting of a switch 78. The signal applied to the circuit input at pin 12 is XLOG which corresponds to the length of the transmit burst, and this signal is supplied to an adjustable 12 bit binary counter 80 which is connected to switch 78. The switch selects the number of transmit cycles and the corresponding minimum range in accordance with the following Table I:

TABLE I

| Switch Settings | | | | | No. of Transmit | Minimum Range |
| A | B | C | D | E | Cycles | (approximate) |
|---|---|---|---|---|---|---|
| 1 | 1 | 1 | 1 | 1 | 3 | 4.5 inches |
| 0 | 1 | 1 | 1 | 0 | 5 | 4.75 inches |
| 0 | 0 | 1 | 1 | 0 | 9 | 5.3 inches |
| 0 | 0 | 0 | 1 | 0 | 25 | 7.5 inches |
| 0 | 0 | 0 | 0 | 1 | 56 (normal) | 10.8 inches |

Sound travels at 1129 ft/sec in air at 20 degrees Celsius. The blanking pulse that inhibits the receiver lasts for 0.4 milliseconds (ms) after the end of the transmission of the ultrasonic burst. For the shortest minimum distance, the preferred embodiment uses a burst of three cycles of a 50 kHz signal. The period of a 50 kHz signal is 0.02 ms and therefore the burst lasts 0.06 ms. This means that the receiver is not enabled until approximately 0.46 ms after the start of the transmission. If we allow the receiver the full duration of an echoed burst to respond and produce an output, the output will come 0.52 ms after the transmission is initiated. Multiplying this delay times the speed of sound in air gives approximately 7 inches, the total minimum distance the sound waves must travel out from and back to the transducer before the receiver will be ready to respond fully. Since 7 inches is the total travel distance, that means an object located at the minimum distance is approximately 3.5 inches from the transducer and therefore from the fluid outlet.

Switch 78 is also connected to a dual AND gate 82 and a dual flip-flop 84 which together produce a modified XLOG signal for power interface circuit 62. The connector pins denoted 8, 3 and 5 on FIG. 10 are for connection to corresponding pins in a connector 88 shown in FIG. 11. A monostable multivibrator 86 provides a reset pulse to counter 80 before the start of the transmission of each ultrasonic burst and also resets flip-flop 84.

Figure 11:
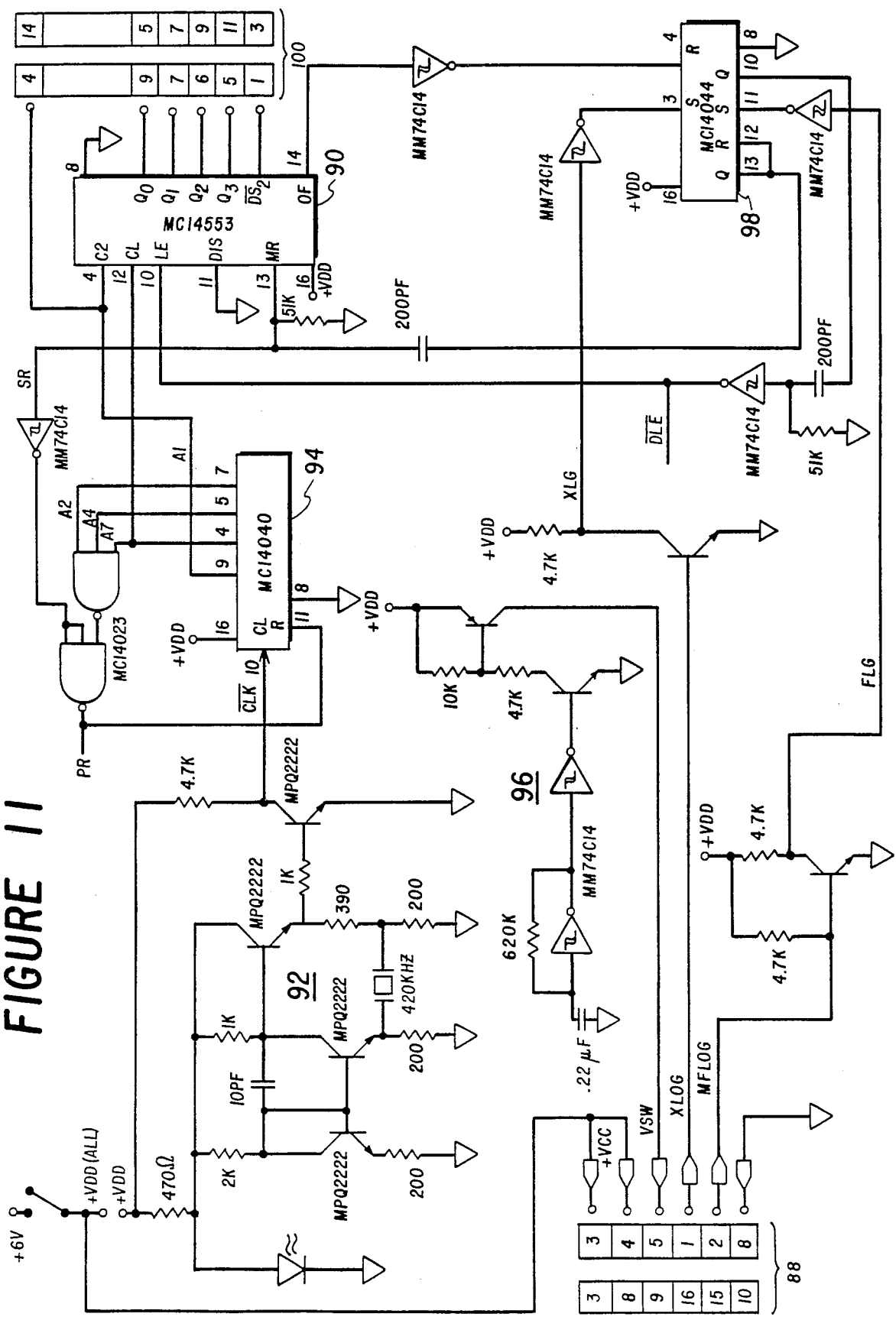
FIG. 11 shows a schematic diagram of a circuit for converting elapsed time signals into distance signals.

FIG. 11 shows a portion of solenoid control circuit 74 which comprises a section of a circuit supplied by Polaroid Corporation known as the EDB. This circuit converts a signal from the ultrasonic circuit board, FIG. 9, that indicates the time elapsed between the transmission of an ultrasonic burst and the receipt of an echo into a signal indicating the distance between the ultrasonic transducer and the object that reflected the burst. Connector 88 connects this circuit to pins on the circuit in FIG. 9 indicated in the left-hand column of boxes in the connector. The heart of the EDB circuit is a three digit binary coded decimal (BCD) counter 90. A clock signal is provided to counter 90 (pin 12) by a crystal controlled oscillator 92 through a divider 94. Each cycle of the output signal of divider 94 is proportional to an increment of distance traveled by the ultrasonic burst. To convert elapsed time into distance counter 90 is started when the ultrasonic burst is transmitted and is stopped when an echo is received. The time the counter has run is then a direct indication of distance between ultrasonic transducer 24 and the object that produced the echo.

An oscillator 96 provides a periodic VSW signal to initiate the transmission of an ultrasonic burst. The VSW signal is supplied to the circuits in FIGS. 9 and 10. The XLOG signal from digital section 64 indicates the exact time of transmission of the ultrasonic burst and is supplied to a latch 98 which in turn supplies a start signal to counter 90. When an echo is received, digital section 64 produces a signal MFLOG which is also supplied to latch 98, and latch provides a stop signal to counter 90. The output pins Q0, Q1, Q2 and Q3 carry a digital signal indicating the value of one of three significant digits representing distance between the ultrasonic transducer and an object. Three other output pins, one of which is denoted DS2, indicate which of the three significant digits is present on the output pins Q0 through Q3. A connector 100 shows the connection points between the output pins on counter 9

Figure 12:
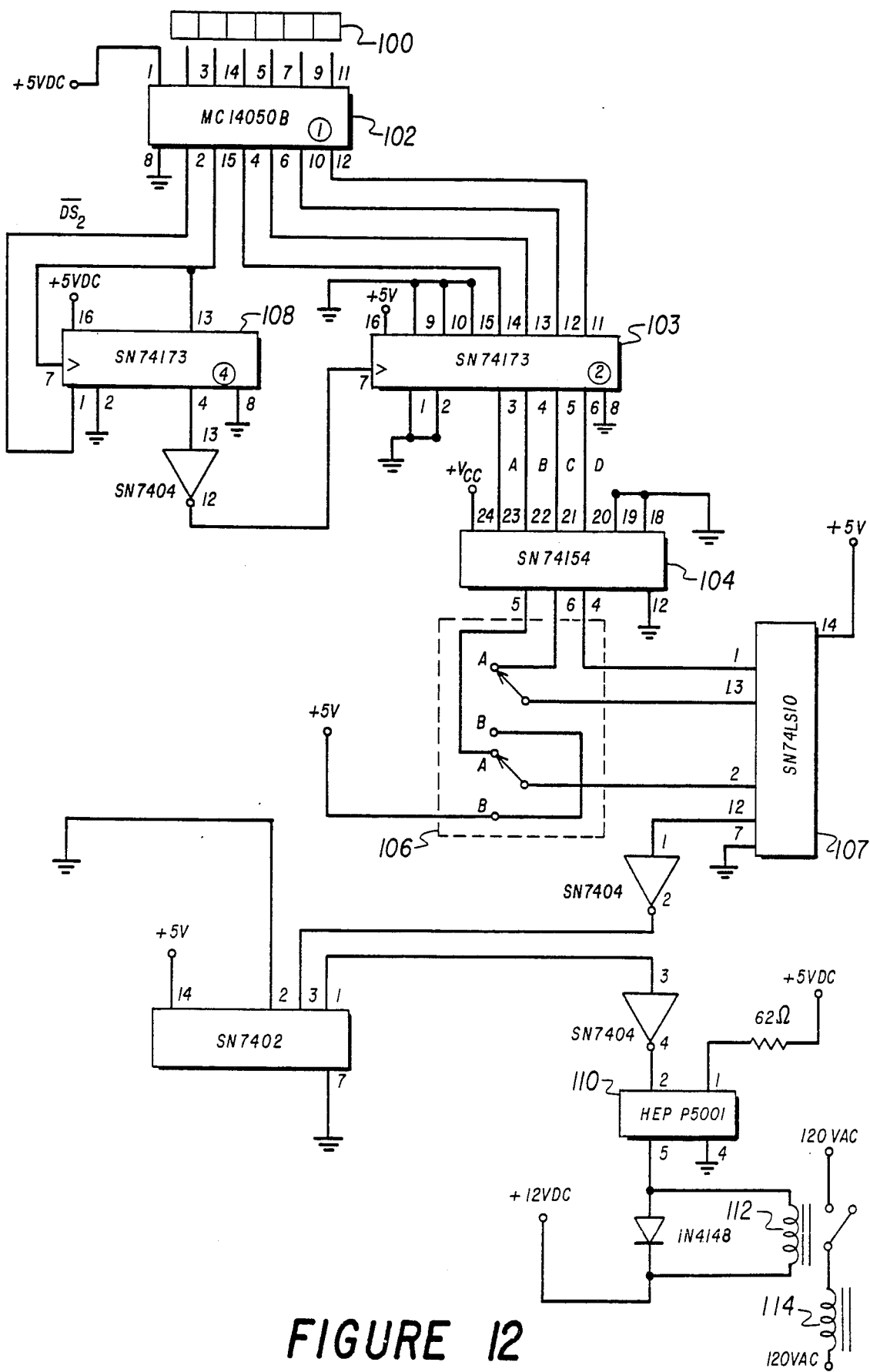
FIG. 12 shows a schematic diagram of a circuit to convert distance signals into on-off signals for a faucet.

FIG. 12 is a schematic diagram of a circuit used to convert the distance information from the EDB circuit in FIG. 11 into an on-off signal for solenoid valve 20. An input buffer circuit 102 is connected to counter 90 in the EDB circuit as described above and supplies buffered digital signals to a quad latch 103. The quad latch in turn is connected to a four line to one of 16 decoder 104. Decoder 104 is used to select the particular value of the least significant digit from counter 90 corresponding to the desired turn-on distance for the faucet. In addition, ranging control is provided by the setting of a switch 106, in cooperation with a NAND gate 107, that is also connected to decoder 104. The digit select signal DS2 is supplied to a latch 108 as is the clock signal from the EDB circuit. When digit select signal DS2 appears, it indicates that the second most significant digit is on the digital output of counter 90 and that consequently the signal that is already in latch 103 is the least most significant digit. At this time the clock signal from the EDB circuit is latched in latch 108, and this latched clock signal is supplied to latch 103. The least significant digit is thereby latched in latch 103 and is decoded by decoder 104.

Ranging control of on-off distances is provided by a switch 106 connected to a NAND gate 107. The switch is also connected to receive output signals from decoder 104 that correspond to possible turn-on distances selected to be less than the distance from the ultrasonic transducer to the bottom of the sink, and the settings of the switch determine the actual turn-on distance. In this embodiment, output pin 4 of decoder 104 corresponds to a turn-on distance of 0.3 feet and output pins 6 and 5 to 0.4 and 0.5 feet, respectively. When an object is approximately at, and not closer than, the distance corresponding to one of these output pins, the signal on that output pin will go low. When a signal on any one of the input terminals of NAND gate 107 is low, the output signal of NAND gate 107 is high, which causes the water to be turned on as is described below. If input pins 4 and 2 of NAND gate 107 are connected to +5 V by switch 106, then the water will be turned on when an object is approximately at, and no closer than, 0.3 feet of the faucet. If the signal on decoder 104 output pin 6 is connected to NAND gate 107, the water will be turned on when an object is approximately at, and not closer than, 0.4 feet of the faucet; and if the signal on pin 5 is connected to the NAND gate, the water will be turned on when an object is approximately at, and not closer than, 0.5 feet. Thus through the use of switch 106 the faucet can be turned on or off at various predetermined heights above the bottom of the sink to allow for the presence of objects in the bottom of the sink without causing the faucet to turn on. In addition, it can be used to govern the amount of water used by controlling how close a user's hands can be to the faucet before the water will turn on as well as how far a user's hands can be from the faucet before it will turn off.

The output signal from NAND gate 107 (pin 12) is passed through some additional circuits for buffering and override control to an optical coupler 110. The optical coupler drives a relay 112 which in turn drives a solenoid 114 in solenoid valve 20. In the preferred embodiment, the relay is a Potter and Brumfield R10-EI-X2V-185 and the solenoid valve is an Eaton BK-25840-1 S-53, a type used in appliances such as washing machines and dish washers.

Figure 13:
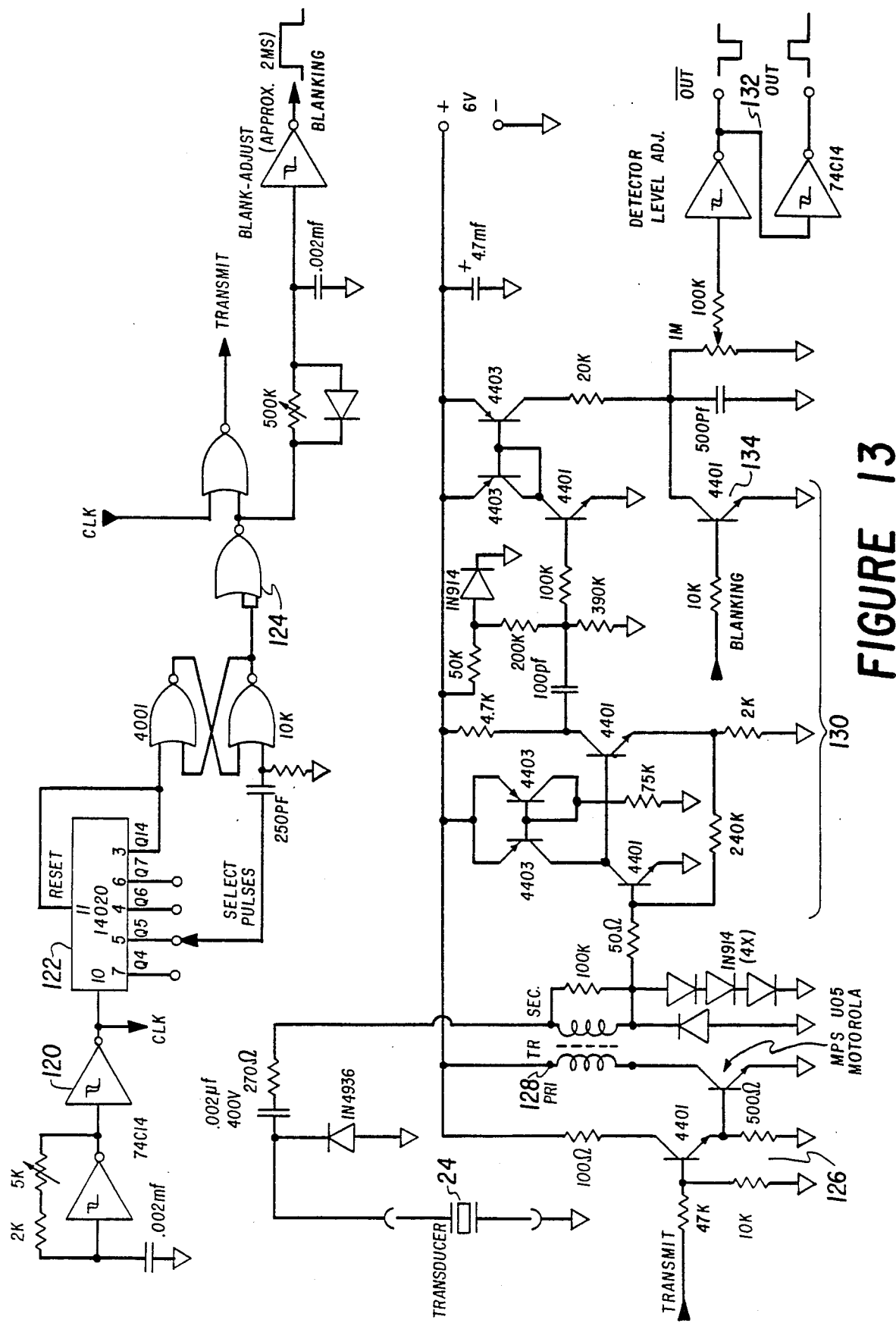
FIG. 13 is a schematic diagram of an alternate circuit to operate the ultrasonic transducer.

FIG. 13 shows a schematic diagram of an alternate circuit to operate the ultrasonic transducer that is simpler than the ultrasonic circuit board supplied by Polaroid. A 47 to 50 kHz ultrasonic signal for the ultrasonic transducer is produced by an oscillator 120 and the number of cycles of the ultrasonic signal that is to be transmitted in each signal burst is determined by a divider circuit 122 and logic circuitry 124 connected to oscillator 120. The number of cycles in the transmitted burst depends upon which output of the divider circuit is connected to a select pulses input of logic circuitry 124. For output Q4 there will be 8 cycles; for Q5, 16 cycles; for Q6, 32 cycles; and for Q7, 64 cycles. The transmit signal from logic circuitry contains a signal burst approximately every 200 milliseconds.

The transmit signal is supplied to the ultrasonic transducer through an amplifier 126 and a transformer 128. The transformer is wound around a Ferroxcube core No. 1107 A250 using 5 turns of No. 32 wire in the primary winding and 220 turns of No. 38 wire in the secondary winding. Echoes received by ultrasonic transducer 24 are amplified and detected in an amplifier and detector circuit 130 connected to the secondary of transformer 128. The output of circuit 130 is delivered to a complementary output buffer circuit 132 to which is also connected a blanking circuit 134 to blank the output when a burst is being transmitted.

When the faucet is used in a typical kitchen sink, it has been found convenient to use 0.5 feet as the normal turn-off distance and 0.3 to 0.4 feet as the turn-on distance. It will be appreciated by those skilled in the art that other distances can be chosen to suit the particular application for which the faucet is used, and that the turn-on and turn-off distances depend on the distances and geometrical relationships between the faucet and the top and the bottom of the sink or other receptacle for the fluid from the faucet.

It will also be appreciated that other parameters can be varied without departing from the spirit and scope of the invention. For example, other drive circuits can be used for the ultrasonic transducer and other types of transducers are available. The location of the ultrasonic transducer on the faucet may also be varied to suit the particular conditions of its use. It has been found convenient to use an ultrasonic transducer in the preferred embodiment that has a cone of radiation of about 30 degrees, with an ultrasonic signal drop of about 20 dB at 20 degrees off axis, so that objects outside of the immediate vicinity of the faucet do not cause the faucet to turn on. However, there may be applications where a wider or narrower cone of radiation will be more suitable. In addition, there may be application where it will be desirable to use separate transmit and receive transducers as shown in previously referenced U.S. Pat. No. 3,522,764 by placing one transducer in front of outlet 22 and the other behind or by placing them side by side.

If it is desired to have the temperature of the water from the faucet controlled automatically, a thermostatically controlled valve, such as commonly available ones using a bimetallic thermostat element, can be used instead of valves 14 and 16. Such a valve would eliminate the need for any adjustments by the user.

Figure 14:
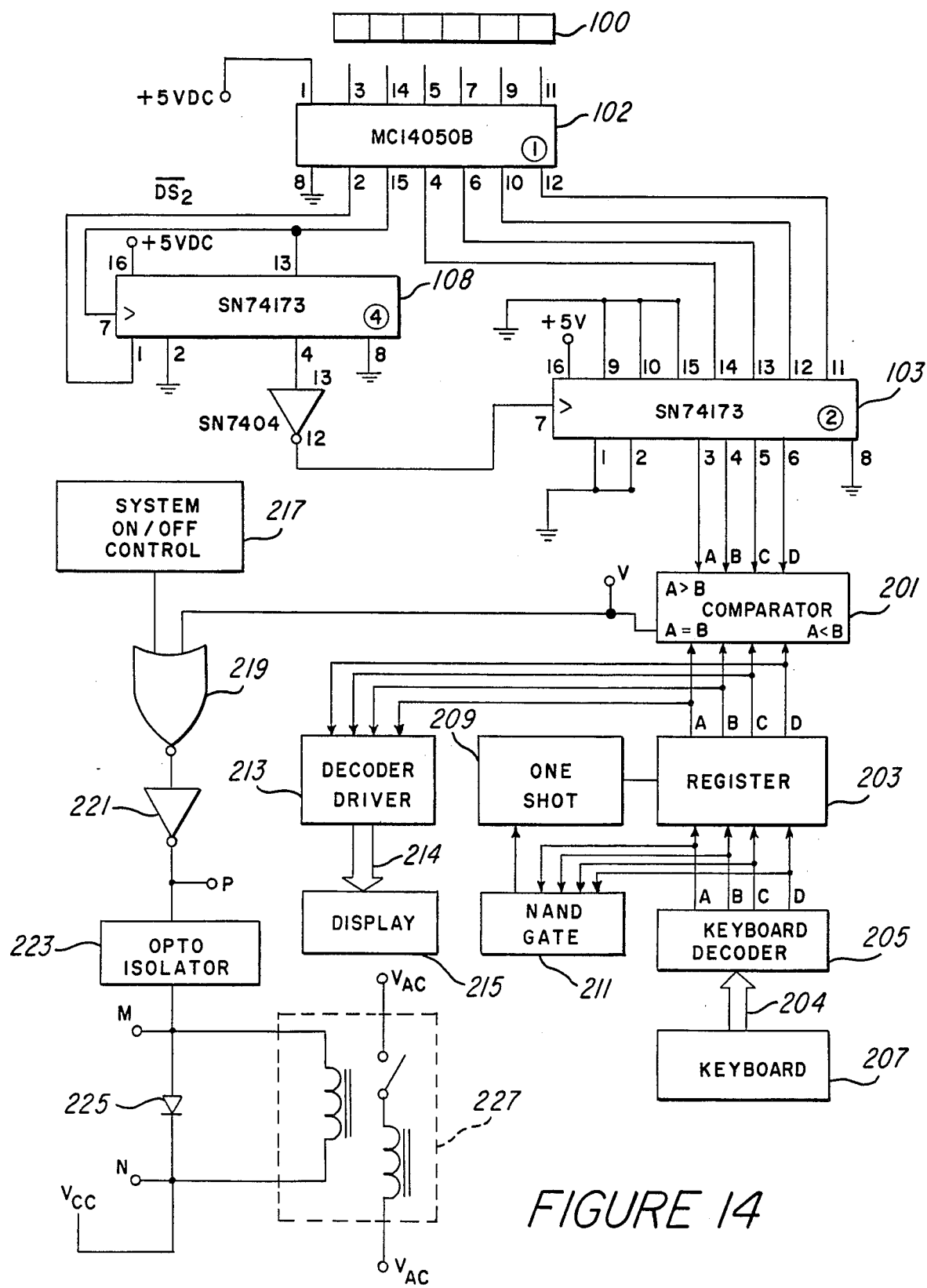
FIG. 14 is a schematic diagram of a second embodiment of the fill control system of the present invention.

Referring next to FIG. 14 there is shown another schematic diagram of a circuit for converting the distance information from the EDB circuit of FIG. 11 into a fill control for selected fill levels. Buffer circuit 102, quad latch 103, and latch 108 are each interconnected with each other and to the EDB circuit of FIG. 11 as are those elements in FIG. 12. The output port of quad latch 103 provides a BCD signal that represents the distance measured by the ranging system.

Also included in FIG. 14 is a keyboard 207 from which the user can select the fluid level desired as discussed further below. The level select signal is transferred from keyboard 207 via bus 204 to keyboard decoder 205 which converts the signal from the keyboard to a BCD format and transfers the converted signal to register 203. The output ports of quad latch 103 and register 203 are coupled to comparator 201 where the two BCD formatted signals are compared. To trigger the transfer of new fill level information to register 203, each of the lines from the output port of keyboard decoder 205 are connected to a different input terminal of four input NAND gate 211, and the output terminal of NAND gate 211 triggers a one shot 209 that has its output terminal connected to the trigger terminal of register 203. Thus, when there is a change in the signal on any one of the output lines of keyboard decoder 205, the data stored in register 203 is updated.

The output port of register 203 is also coupled to the input port of decoder driver 213 to decode and reformat the BCD data to display the fill level selected by the user on display 215. As will be seen in more detail below, display 215 could be any type of display (e.g. a seven segment display and discrete lamps each having a fill level designation).

When the signal values applied to comparator 201 are the same, the A=B signal goes to a logical high and is applied to one input terminal of NOR gate 219. The other input terminal of NOR gate 219 is connected to the output terminal of system on/off control 217. When both of the signals on the input terminals of NOR gate 219 are low, fill solenoid 227 is activated, and if either one or both of the input signals to NOR gate 219 goes high solenoid 227 is inactivated. As shown in FIG. 14, the output signal of NOR gate 219 is coupled to solenoid 227 via inverter 221, opto isolator 223 and optical diode 225.

Figure 15:
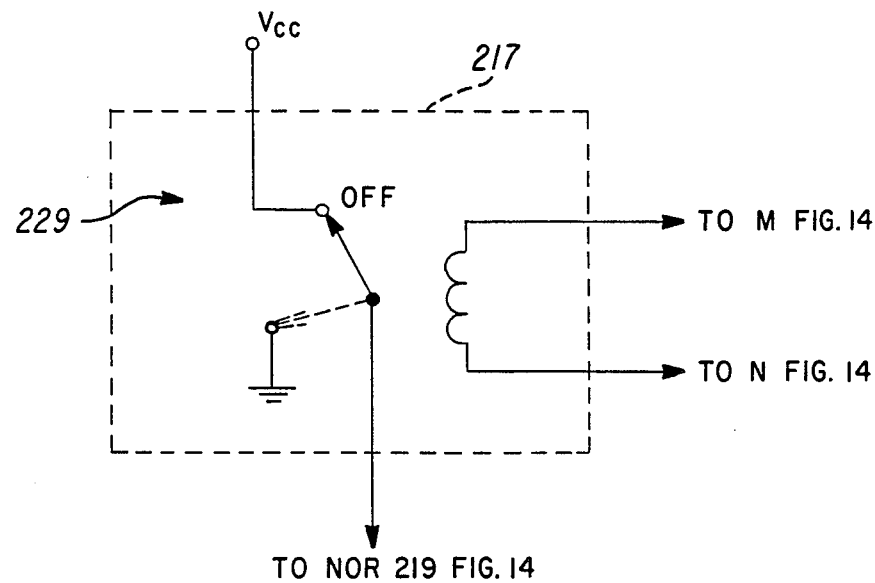
FIG. 15 is a schematic diagram of one embodiment of the system on/off control as shown in FIG. 14.

FIG. 15 shows one embodiment of system on/off control 217. Included is a magnetically latching switch 229 with the latching coil shown being connected across optical diode 225 (FIG. 14). In this configuration, switch 229 once depressed will remain activated until solenoid 227 is deactivated by a high signal from comparator 201. This arrangement insures that the fill system is off until it is again activated by the user.

Figure 16:
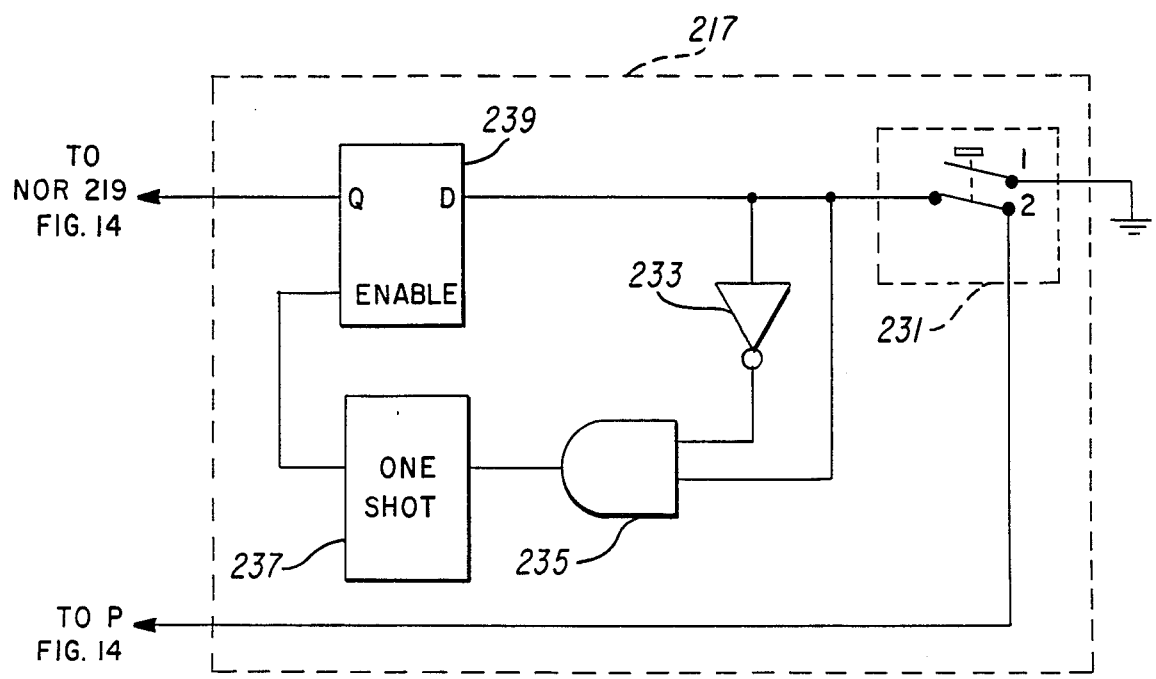
FIG. 16 is a schematic diagram of another embodiment of the system on/off control as shown in FIG. 14.

Another embodiment for system on/off control 217 is shown in FIG. 16. Included is a two gang single pole on/off switch 231 with the normally open gang connected to ground. The other gang is normally closed with one end connected to point P in FIG. 14 (input terminal of opto isolator 223) and the other end connected to the D terminal of D flip-flop 239, the input terminal of inverter 233 and one of the input terminals of two input AND gate 235. The output terminal of inverter 233 is in turn connected to the other input terminal of AND gate 235. The output terminal of AND gate 235 is connected to the trigger terminal of one shot 237, and the output terminal of one shot 237 is connected to the enable terminal of flip-flop 239. Finally, the output terminal of flip-flop 239 is connected to the second input terminal of NOR gate 219 in FIG. 14. In the quiescent state, the signals present on the input terminals of AND gate 235 are each a different state. When switch 231 is depressed, because of the difference in the propagation times between the switch and the two input terminals of AND gate 235, a momentary pulse appears on the output terminal of AND gate 235 which triggers a state change in flip-flop 239 via one shot 237. The circuit shown here is an electronic latching switch circuit which changes state each time switch 231 is depressed.

Figure 23:
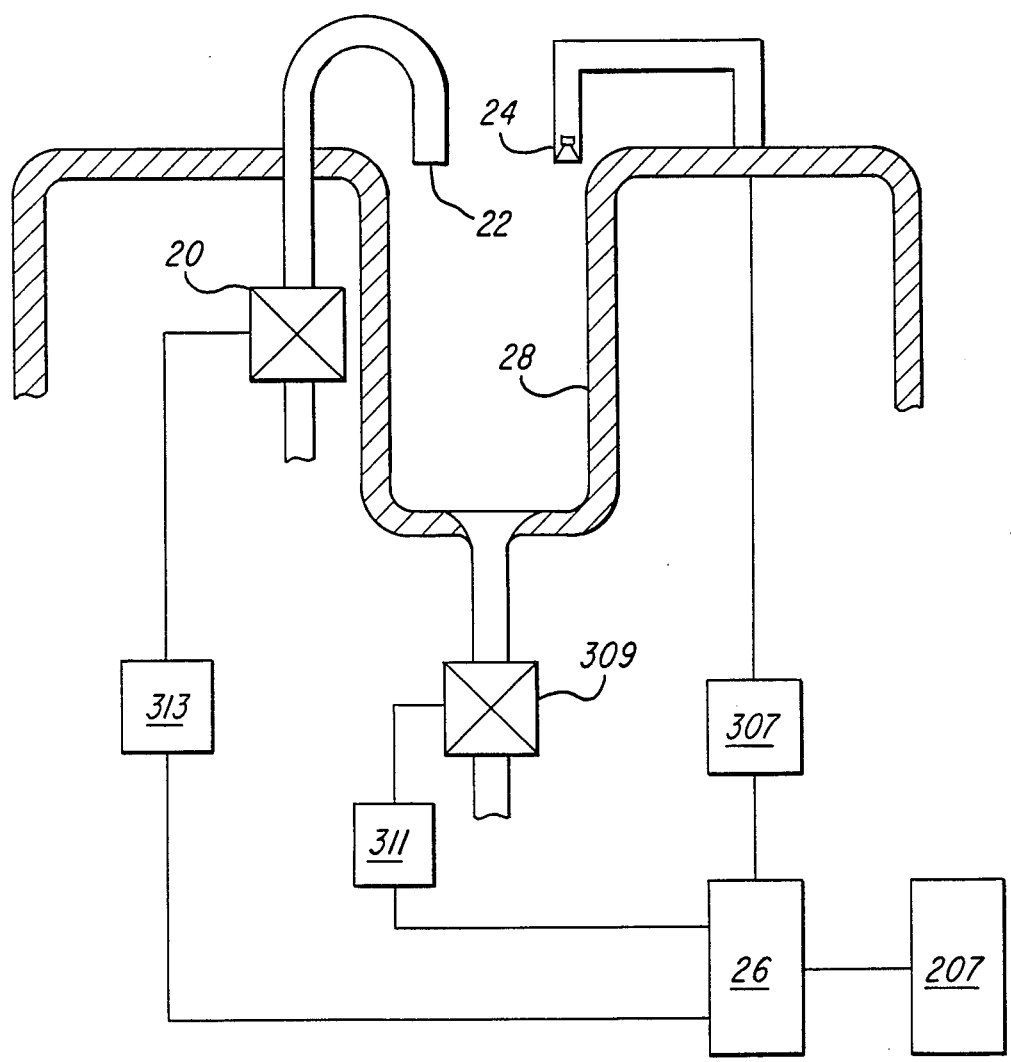
FIG. 23 is a schematic representation of the integrated fill and drain system of the present invention.

To complete the system, a drain control function can be integrated with the fill control. The discussion that follows is for such a drain control function. A schematic diagram of such a system is shown in FIG. 23. Included is a sink or tub 28 with a range sensor 24 on one side and a water faucet 22 on an opposite side. Also included is a control panel 207 from which the user can turn the system on or off, select the fill level and instruct the system to drain off some or all of the water from sink 28. Control panel 207 is connected to system control 26 which communicates with fill solenoid control 313, drain solenoid control 311 and sensor electronics 307. In response to signals from sensor 24 and control panel 207, control 26 opens and closes fill and drain solenoids 20 and 309, respectively, as necessary.

Figure 17:
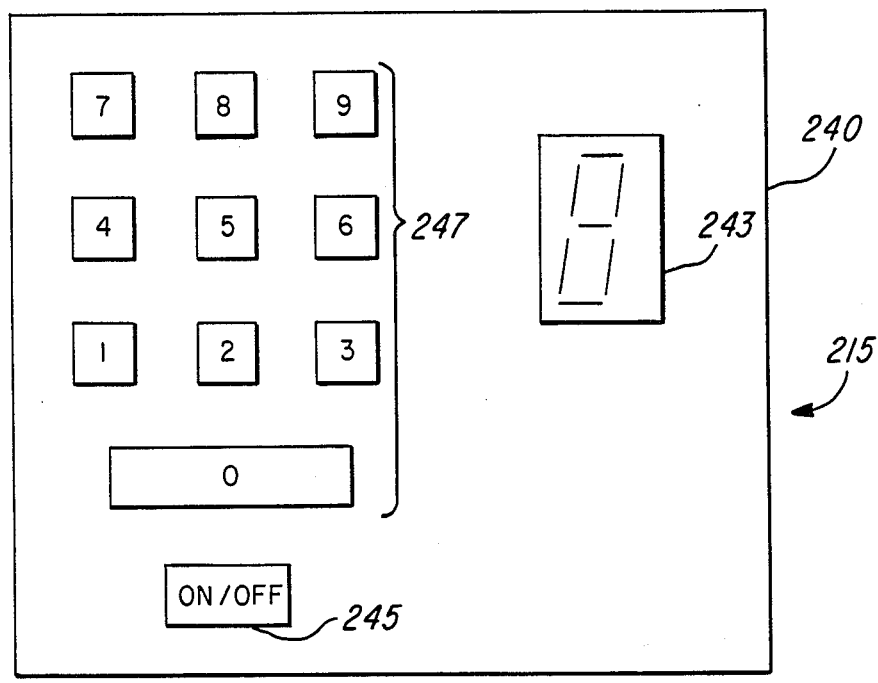
FIG. 17 is a representation of a digital input and display panel of the present invention as shown in FIG. 14.
Figure 18:
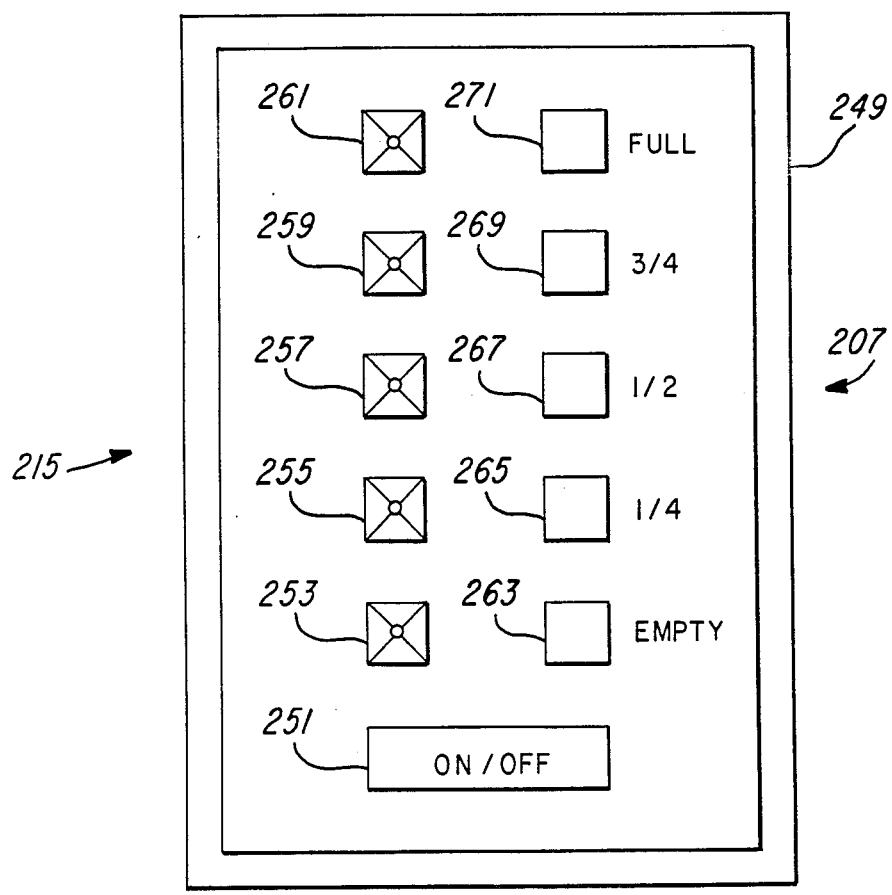
FIG. 18 is a representation of a discrete level input and display panel of the present invention as shown in FIG. 14.

FIGS. 17 and 18 each show a different embodiment of keyboard 207, display 215, and on/off switch 217 on a common panel. In FIG. 17 the panel includes a decimal keypad 247, a seven segment display 243, and on/off switch 245. In FIG. 18 the keypad includes individual switches 263–271 for selected fill levels from empty through full in 1/4 capacity increments, individual lamps 253–261 for the same selected fill levels as assigned to the switches, and an on/off switch 251.

Figure 19:
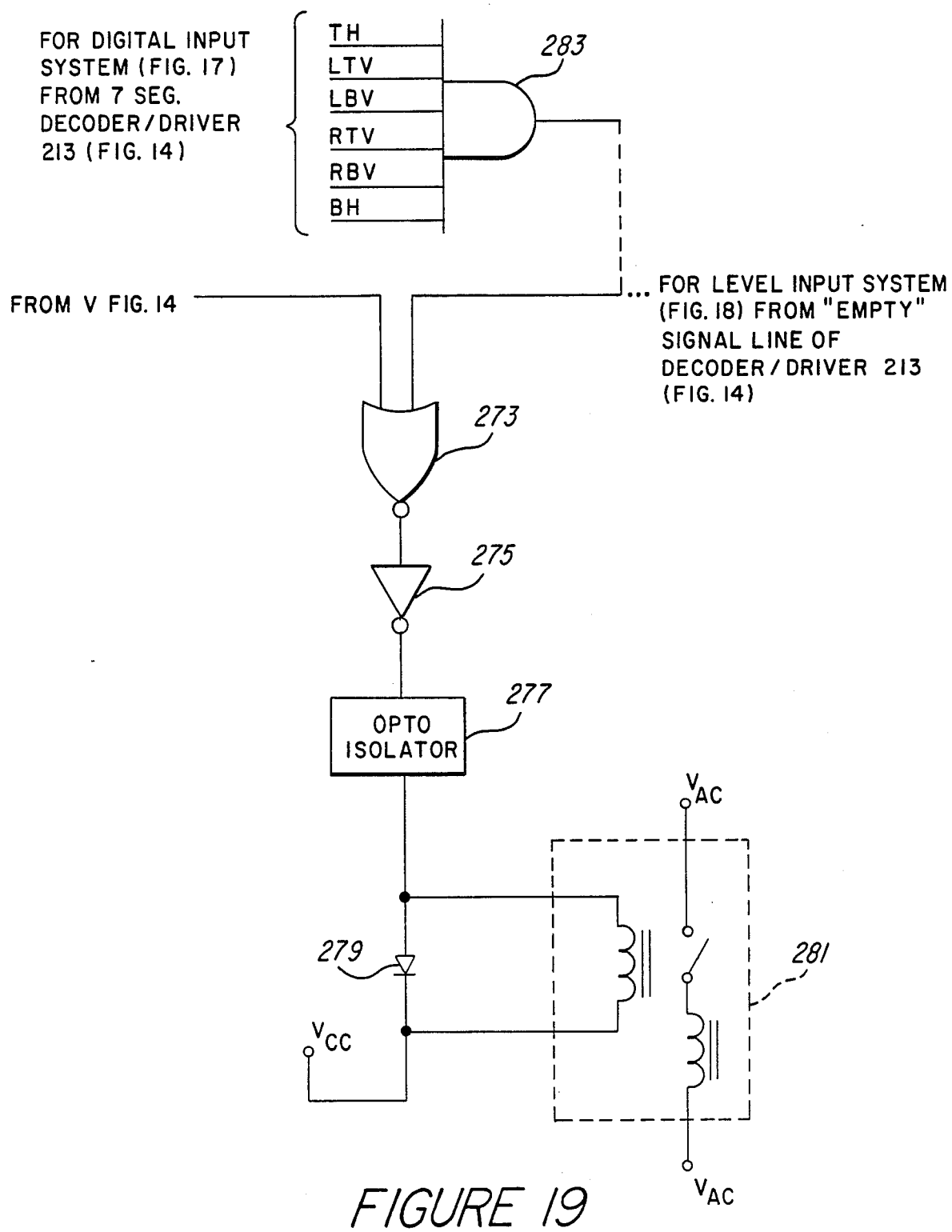
FIG. 19 is a schematic of one embodiment of the drain control system of the present invention.

FIG. 19 shows one embodiment for the system drain function. This embodiment consists of a two input terminal NOR gate 273 which receives one input signal from the A=B terminal of comparator 201 (FIG. 14) and an empty signal entered by the user via display decoder/driver 213. If the display 215 is a seven segment display, then a six input terminal AND gate 283 is connected to receive from display decoder/driver 213 the signals that control the top horizontal (TH), left top vertical (LTV), left bottom vertical (LBV), right top vertical (RTV), right bottom vertical (RBV), and bottom horizontal (BH) segments. When each of those segment signals is positive, the value to be displayed is "zero".

When the display 215 consists of level values (e.g. ¼, ½, etc.) display decoder/driver 213 is a BCD decoder. In this case the other input terminal of NOR gate 273 is connected to the "empty" or "zero" signal line from decoder 213 (FIG. 14).

The output signal from NOR gate 273 is then coupled via inverter 275 to opto isolator 277 which controls diode 279, which then activates solenoid 281.

When the user selects an empty level, a value representative of that value is latched into register 203 and then compared to the actual level reported by sensor 24. The A=B signal from comparator 201 goes low and is applied to one input terminal of NOR gate 273 which causes the output signal from NOR gate 273 to go low which, in turn, causes drain solenoid 281 to activate and thus open the drain to permit water to flow from the sink or tub. This circuit could also be easily modified by one skilled in the art to selectively reduce the fluid level within the sink to a lower selected level other than zero. When sensor 24 detects that the water level has dropped to the desired level, the A=B output signal from comparator 201 again goes high which causes the output signal from NOR gate 273 to go low, thus inactivating solenoid 281 and again closing the drain. In this configuration the user can cause the sink to fill to a higher level when it is partially full by selecting a higher level setting from keyboard 207, however, the only drain level that can be selected is "empty".

Alternatively, if comparator 201 also has A<B and A>B output signals available, were A is the BCD value in latch 103 and B is the BCD value in register 203, it would be possible to both increase and decrease the water level in the sink to a desired level from the keyboard. In this configuration, the output line between comparator 201 and NOR gate 219 would be from the A<B terminal instead of the A=B terminal. Thus, when the A<B signal is high (actual level less than selected level) the fill solenoid will be activated. When A=B the A<B signal will again go low and the fill solenoid will be deactivated.

The drain circuit would be modified by the elimination of AND gate 283, NOR gate 273 and inverter 275, and the application of the A>B signal from comparator 201 to opto isolator 277. In this configuration when the user has selected a level that is less than the level currently being read by sensor 24, the A>B signal will be high causing the drain solenoid to activate. When A=B the A>B signal will again go low and the drain solenoid will deactivate.

Figure 20:
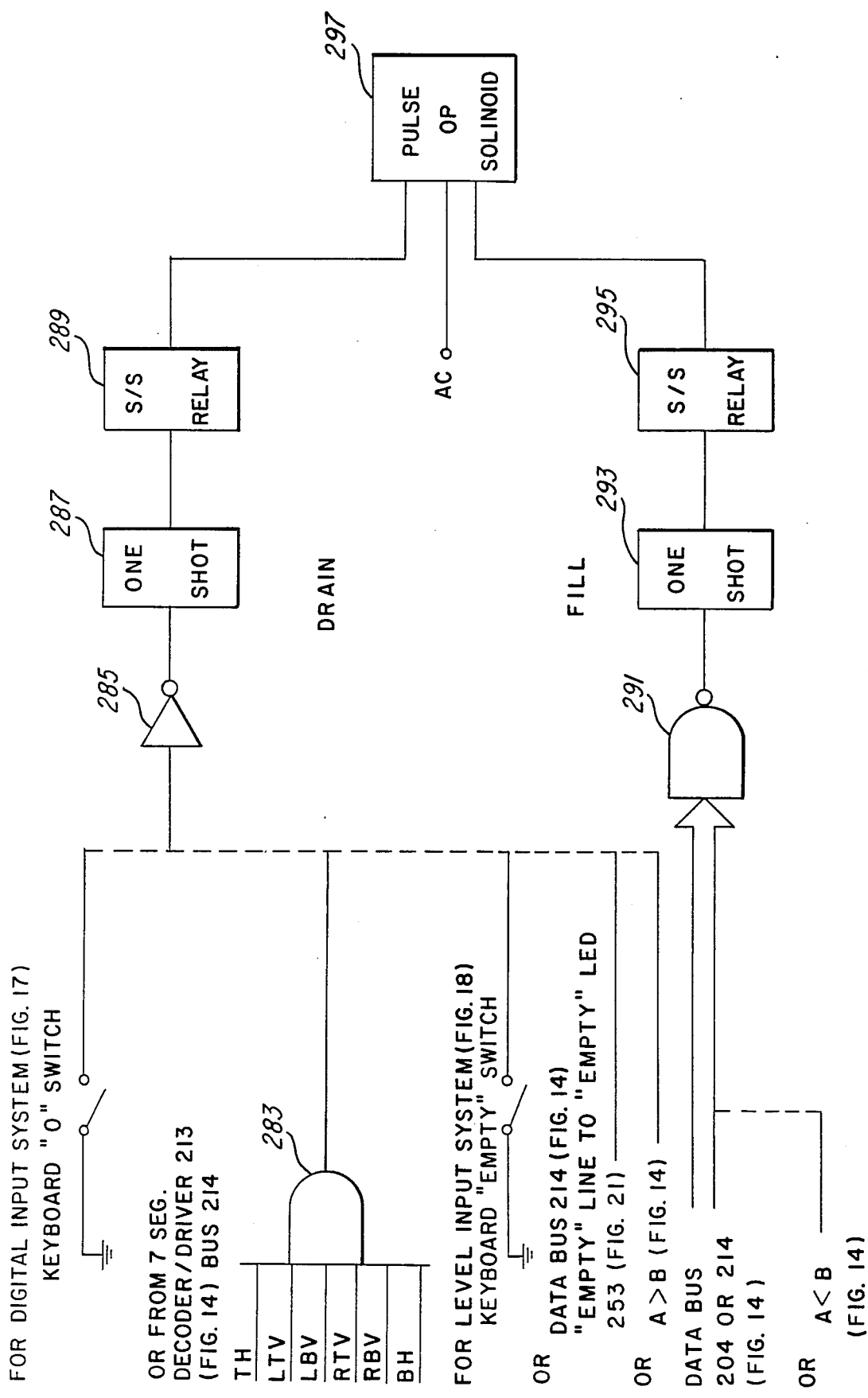
FIG. 20 is a schematic of another embodiment of the drain control system of the present invention.

FIG. 20 shows another circuit for the drain control portion of the system. The heart of this configuration is a pulse activated latching solenoid. The top portion of the schematic controls the opening of the drain solenoid and the bottom portion of the schematic controls the closing of the drain solenoid. In the upper left of the schematic there are five alternative ways for triggering the operation of pulse operated solenoid 237. For a system having the digital keyboard input system of FIG. 17, the draining of the sink can be triggered by either the "0" switch or by the use of AND gate 283 coupled to a seven segment display driver as discussed above with reference to FIG. 19. When the input keyboard is of the level selection type of FIG. 18, the drain control can be triggered by the closure of the "empty" switch, from the "empty" line of data bus 214 (FIG. 14) or from the "empty" LED 253 of FIG. 21. For a system that utilizes the A<B and the A>B output lines from comparator 201, the A>B line can be used to activate the drain solenoid 237 as discussed above.

The signal from any one of these five sources is coupled to the serial signal path through an inverter 285, that triggers a one shot 287, which then activates a solid state relay 289 (e.g. Teledyne Model 645), that then applies a pulse to solenoid 237 to open the drain. The pulse operated solenoid can be implemented with MAGNALATCH from Honeywell Skinner Valve Company. In this type of solenoid only brief pulses of electric current are necessary to switch the valve from one state to the other.

The bottom portion of the schematic in this figure is necessary to reclose the drain so that filling of the sink can be accomplished. The signal to reset solenoid 297 is derived from either of data buses 204 or 214 (FIG. 14), or from the A<B signal from comparator 201 (FIG. 14). The data bus is coupled to NOR gate 291 which has as many input lines as there are lines in the data bus, only one line (an inverter) if the A<B signal is used. The output signal from NAND gate 291 is connected to one shot 293, which in turn is connected to a solid state relay 295 that triggers solenoid 297 to close.

Other forms of solenoid activation may be employed for the valve actuation, such as a mechanical linkage to existing "pop up" type tub and sink drains in which an electric solenoid pushes against a mechanical valve actuating cam as disclosed in a U.S. Patent to Pulvari.

Figure 21:
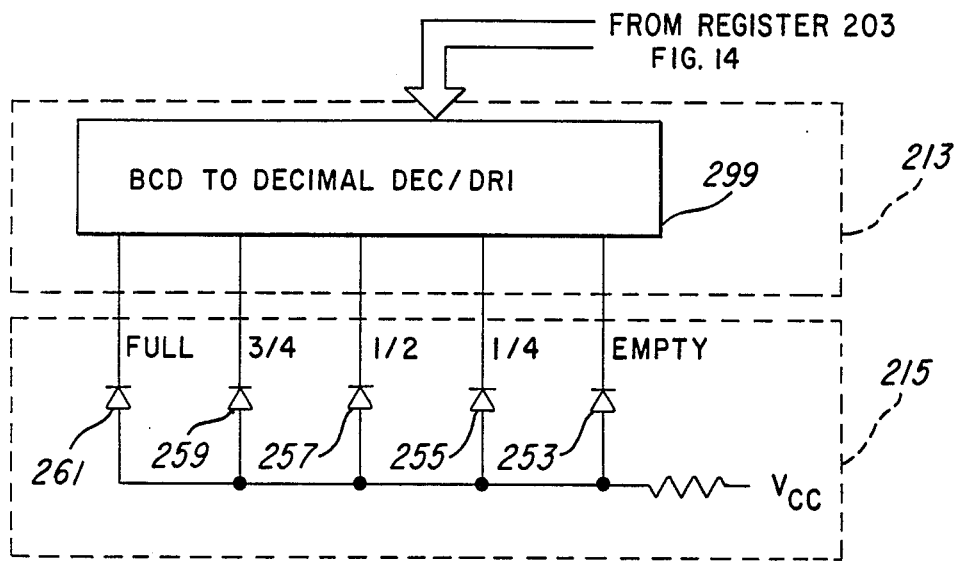
FIG. 21 is a schematic representation of the decoder/driver and display for the discrete level input designation embodiment of the present invention.

FIG. 21 illustrates decoder/driver 213 and display 215 when actual fill levels are used in the system. Decoder/driver 213 consists of a BCD to decimal decoder/driver 299, and display 215 consists of LEDs 253-261. Each of LEDs 253-261 are connected to the decimal output line that corresponds to fill levels of "empty", "$\frac{1}{4}$", "$\frac{1}{2}$", "$\frac{3}{4}$", and "full".

Figure 22:
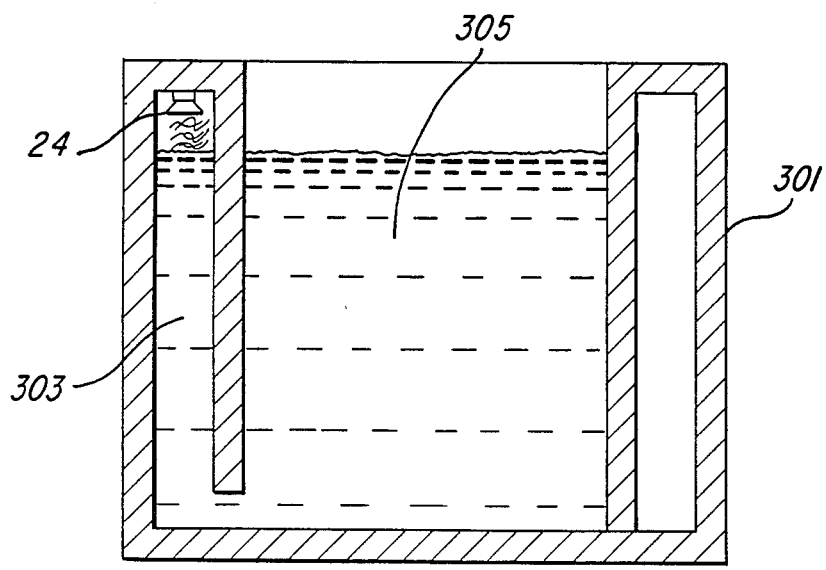
FIG. 22 is a cross-sectional view of a tub or sink having a pilot well for housing the level sensor.

If it is desired to conceal the distance measuring sensor 24 from view so that the user surface of the tub or sink is smooth and free from obstructions (as in the case of a large whirlpool bath), the sensor 24 can be mounted a the top of a concealed pilot well 303 that is connected by piping at it's bottom end to the main body 305 of the tub or sink as shown in FIG. 22. When the sensor 24 is mounted in this location, it will read the fluid level in the pilot well that tracks the rise and fall of the fluid level in the main body 305 of the tub or sink 301.

What is claimed is:

1. A method of controlling the flow of fluid from a faucet having a fluid outlet comprising;
    measuring the distance of an object from the faucet fluid outlet and detecting whether the object is in a position where the fluid will flow onto the object from the fluid outlet;
    causing the fluid to flow when the distance is equal to or less than a first predetermined limit but equal to or greater than a second predetermined limit and the object is in a position where the fluid will flow onto the object from the fluid outlet; and
    preventing the fluid from flowing when the distance is greater than the first predetermined limit or less than the second predetermined limit or the object is not in a position where the fluid will flow onto the object from the fluid outlet.

2. A method as in claim 1 wherein at least one of the first and second predetermined limits is adjustable.

3. A method as in claim 1 wherein the step of measuring the distance of an object from the faucet fluid outlet further comprises the steps of:
    emitting an ultrasonic signal;
    detecting an ultrasonic echo; and
    measuring the time elapsed between the emission of the ultrasonic signal and the detection of the ultrasonic echo.

4. A method as in claim 3 wherein the step of causing the fluid to flow comprises detecting when the time elapsed between the emission of the ultrasonic signal and the detection of the ultrasonic echo is equal to or less than a first predetermined time but equal to or greater than a second predetermined time.

5. A method as in claim 4 wherein the step of preventing the fluid from flowing comprises detecting when the time elapsed between the emission of the ultrasonic signal and the detection of the ultrasonic echo is more than the first predetermined time or less than the second predetermined time.

6. A method as in claim 4 wherein at least one of the predetermined times is adjustable.

7. A method as in claim 5 wherein at least one of the predetermined times is adjustable.

8. A method of controlling the flow of fluid from a faucet having a fluid outlet comprising:

measuring the distance of a surface from the faucet fluid outlet and detecting whether the surface is in a position where the fluid will flow onto the surface from the fluid outlet;

causing the fluid to flow when the distance is equal to or less than a first predetermined limit but equal to or greater than a second predetermined limit and the surface is in a position where the fluid will flow onto the surface from the fluid outlet; and preventing the fluid from flowing when the distance is greater than the first predetermined limit or less than the second predetermined limit or the surface is not in a position where the fluid will flow onto the surface from the fluid outlet.

9. a method as in claim 8 wherein at least one of the first and second predetermined limits is adjustable.

10. A method as in claim 9 wherein the step of measuring the distance of a surface from the faucet fluid outlet further comprises the steps of:

emitting an ultrasonic signal;

detecting an ultrasonic echo; and measuring the time elapsed between the emission of the ultrasonic signal and the detection of the ultrasonic echo.

11. A method as in claim 10 wherein the step of causing the fluid to flow comprises detecting when the time elapsed between the emission of the ultrasonic signal and the detection of the ultrasonic echo is equal to or less than a first predetermined time but equal to or greater than a second predetermined time.

12. A method as in claim 11 wherein the step of preventing the fluid from flowing comprises detecting when the time elapsed between the emission of the ultrasonic signal and the detection of the ultrasonic echo is more than the first predetermined time or less than the second predetermined time.

13. A method as in claim 11 wherein at least one of the predetermined times is adjustable.

14. A method as in claim 12 wherein at least one of the predetermined times is adjustable.

* * * * *